United States Patent [19]

Kotani et al.

[11] Patent Number: 4,841,374
[45] Date of Patent: Jun. 20, 1989

[54] IMAGE PROCESSING METHOD

[75] Inventors: Matahira Kotani, Nara; Motohiko Hayashi; Masafumi Yamanoue, both of Yamatokoriyama, all of Japan

[73] Assignee: Sharp Kabushiki Kaisha, Osaka, Japan

[21] Appl. No.: 931,843

[22] Filed: Nov. 18, 1986

[30] Foreign Application Priority Data

Nov. 18, 1985 [JP] Japan .................. 60-259473

[51] Int. Cl.$^4$ ............................ H04M 1/40
[52] U.S. Cl. .................. 358/280; 358/282; 358/284
[58] Field of Search ............... 358/280, 282, 284

[56] References Cited

U.S. PATENT DOCUMENTS 4,150,401 4/1979 Yamamoto .................. 358/284
4,450,483 5/1984 Coviello .................... 358/284
4,509,195 4/1985 Nadler ..................... 358/284

FOREIGN PATENT DOCUMENTS 56-109069 8/1981 Japan .
59-221074 12/1984 Japan .

Primary Examiner—Edward L. Coles, Sr.
Attorney, Agent, or Firm—Birch, Stewart, Kolasch & Birch

[57] ABSTRACT

In an image processing apparatus or a method for expressing a halftone-including original image with binary black-and-white pixels and reproducing the original image in the form of a binary-coded output, the feature of the present invention resides in detecting, relative to each of the pixel units obtained by scanning and sampling the original image, a first average density level representative of the average density level of the pixel unit within a first specific reference pixel region composed of pixel unit groups adjacent to the subject pixel unit on the left and right. A second average density level represents of the average density level of the pixel unit within a second specific reference pixel region composed of a pixel unit group adjacent to the first specific reference pixel region from above. The density level of the subject pixel unit is detected in accordance with the first and second average density levels, thereby enabling correction of the gradation.

4 Claims, 2 Drawing Sheets

FIG. 1a

| | Xn-7/yn-7 | Xn-6/yn-6 | Xn-5/yn-5 | Xn-4/yn-4 | Xn-3/yn-3 | Xn-2/yn-2 | Xn-1/yn-1 | Xn/yn | Xn+1/yn+1 | Xn+2/yn+2 | Xn+3/yn+3 | Xn+4/yn+4 | Xn+5/yn+5 | Xn+6/yn+6 | Xn+7/yn+7 | Xn+8/yn+8 |

PRECEDING LINE / PRESENT LINE

FIG. 1b

| Xn-7 | Xn-6 | Xn-5 | Xn-4 | Xn-3 | Xn-2 | Xn-1 | Xn | Xn+1 | Xn+2 | Xn+3 | Xn+4 | Xn+5 | Xn+6 | Xn+7 | Xn+8 |

IMAGE PROCESSING METHOD

BACKGROUND OF THE INVENTION

The present invention relates to a gradation image processing apparatus and a method for expressing a halftone-including image in a facsimile or the like with binary black-and-white pixels.

In an apparatus such as a facsimile for scanning and sampling an original to read out its image per pixel unit and copying the image thus read out, the purpose of the apparatus is not to achieve a faithful reproduction of the image. An improvement of the image is attempted by processing the image signal to emphasize or extract specific data of the original image for eliminating the noise component included in the original image or for restoring the sharpness of the image.

In a conventional image processing method which eliminates noise components in an original image, the noise is smoothed by first detecting the densities of specific pixels adjacent to a subject pixel, and taking the accumulated density frequency distribution per sampling level to process an average value as the density level of the subject pixel. Although such an image processing method is effective to smooth the reproduced image by eliminating of granular noise, disadvantages exist that include a loss of the image signal steepness in a portion of the original image where the density change is great, i.e. a loss of the image sharpness which eventually renders the image indistinct. Furthermore, it is impossible to eliminate the noise that is derived from the soiled surface of the original.

According to another conventional image processing method, the minimal level of specific pixels adjacent to a subject pixel is subtracted from the density level of the subject pixel. The value thus obtained is regarded as the true density level of the latter pixel. However, in an image processing method, the densitylevel variation range is reduced which consequently brings about a lower contrast of the image as a whole. Another unavoidable drawback is that the granular noise cannot substantially be eliminated.

SUMMARY OF THE INVENTION

The present invention has been accomplished in view of the above-mentioned problems known heretofore. The principal object resides in providing an image processing method which eliminates both granular noise and noise derived from a soiled surface of an original. The gradation is corrects in a wide density variation range to reproduce a high-contrast image without causing a reduction of the image sharpness.

Another object of the invention is to provide an image processing apparatus capable of eliminating both granular noise and noise derived from a soiled surface of an original The gradation is corrected in a wide density variation range to reproduce a high-contrast image without causing the image sharpness to deteriorate.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

According to an embodiment of the present invention, in order to attain the objects mentioned, an image processing apparatus or a method for expressing a halftoneincluding original image in a facsimile or the like with binary black-and-white pixels and reproducing the original image in the form of a binary-coded output is so contrived that, relative to each of the pixel units obtained by scanning and sampling the original image. A first average density level is detected which represents the average density level of the pixel unit within a first specific reference pixel region composed of pixel unit groups adjacent to the subject pixel unit on the left and right. A second average density level is detected which represents the average density level of the pixel unit within a second specific reference pixel region composed of a pixel unit group adjacent to the first specific reference pixel region from above. The density level of the subject pixel unit is determined in accordance with the first and second average density levels.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 (a) shows an example of pixel regions adjacent to a specific pixel plotted at the center;

FIG. 1 (b) schematically shows a pixel array with average values of vertical pixel data.

DETAILED DESCRIPTION OF THE PREFERRED EMBODIMENT

Figure 2:
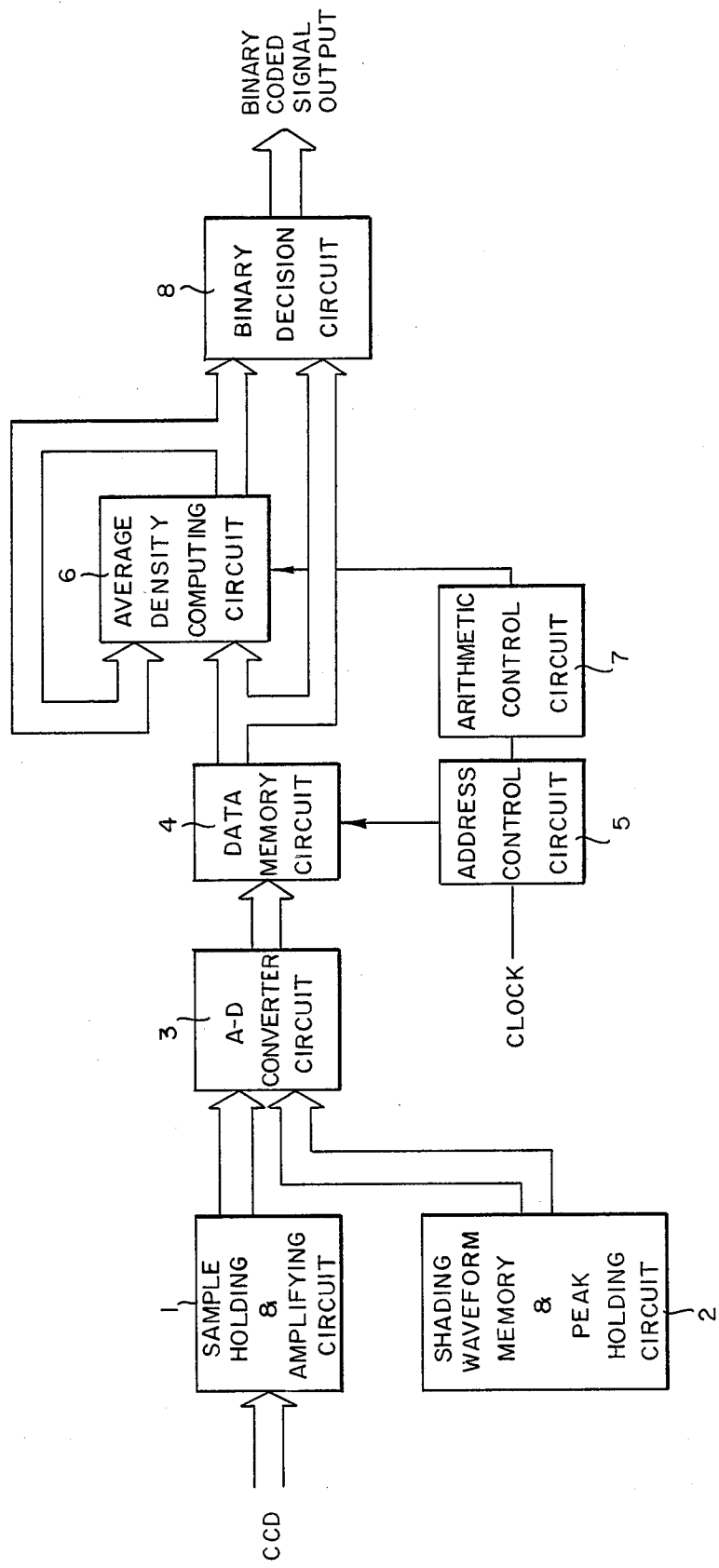
FIG. 2 is a block diagram of an exemplary image processing apparatus designed to carry out the method of the present invention.

Hereinafter a preferred embodiment of the present invention will be described with reference to the accompanying drawings.

FIG. 1 (a) shows a 16×1 pixel region composed of pixels $x_{n-7}$ to $x_{n+8}$ inclusive of a subject pixel $x_n$ obtained by the present scanning, and another 16×1 pixel region composed of pixels $Y_{n-7}$ to $Y_{n+8}$ obtained by the previous scanning. In this invention, the density gradation of the subject pixel $x_n$ is corrected in accordance with individual input data in such 2×16 pixel regions. According to the image processing method of the invention, out of the entire image signals of pixel units obtained by scanning and sampling the original image, the present-line pixels $x_{n-7}, x_{n-6}, x_{n-5}, \ldots x_n, \ldots x_{n+6}, x_{n+7}$ and $x_{n+8}$ inclusive of the subject pixel $x_n$ and the preceding-line pixels $Y_{n-7}, Y_{n-6}, Y_{n-5}, \ldots Y_n, \ldots Y_{n+6}, Y_{n+7}$ and $Y_{n+8}$ corresponding positionally to the present-line pixels are defined as a specific reference image region with respect to the subject pixel. The average density level of the pixels constituting such a specific reference image region is detected, and subsequently such a detected average density level of the specific reference pixel region is compared with the image input data of the subject pixel H, whereby the density gradation of the subject pixel $x_n$ is corrected.

The average density $D'n$ in such a specific reference pixel region can be computed from the following equation with respect to the subject pixel $x_n$.

$$D'n = \frac{\sum\limits_{n-8}^{n+7} x_n}{16} \quad (1)$$

However, the result thus obtained from Eq. (1) represents the average density of merely the present-line pixels in the specific reference pixel region. Therefore, in order to compute the average density relative to the preceding-line region as well, this invention is so contrived as to first compute the average image input data of the present-line pixels and that of the precedingline pixels positionally corresponding thereto. Then, the average value of the respective input data is taken to obtain the average density of the specific reference pixel region. The average value $X_{n+m}$ ($0 \leq m \leq 8$) of the pixels in the preceding line and the present line positionally corresponding to each other is expressed as $$X_{n \pm m} = \frac{y_{n \pm m} + x_{n \pm m}}{2} \quad (2)$$

where $Y_{n \pm m}$ ($0 \leq m \leq 8$) represents the image input data of the preceding-line pixels, and $x_{n \pm m}$ ($0 \leq m \leq 8$) represents the image input data of the present line pixels. As shown in FIG. 1 (b), an apparent single line can be assumed by taking the average of the preceding and present lines, thereby enabling the adoption of Eq. (1) to eventually obtain the average density in the specific reference pixel region. Therefore, the above can be expressed as $$D_n = \frac{\sum\limits_{n-8}^{n+7} X_n}{16} \quad (3)$$

FIG. 2 shows an exemplary constitution of an image processing apparatus designed to carry out the method of this invention. The analog image signal is obtained by scanning an original image through the use of an image reader such as a charge-coupled device (CCD). The analog image signed is sampled and amplified by a sample holding and amplifying circuit 1 and is inputted to an analog-digital converter circuit 3. A shading waveform memory and peak holding circuit 2 is connected to the other input terminal of the analog-digital converter circuit 3 and a peak holding operation is performed within the effective range of the image signal to produce a shading waveform output proportional to the peak value. The analog-digital converter circuit 3 corrects the shading of the input analog image signal from the sample holding and amplifying circuit 1 in accordance with the shading waveform received from the shading waveform memory and peak holding circuit 2 to produce digital image data. The digital image data is then fed to a data memory circuit 4 and is stored at a predetermined address in accordance with a memory address instruction signal inputted from an address control circuit 5.

Subsequently, in response to an arithmetic control signal received from an arithmetic control circuit 7, an average density computing circuit 6 executes addition and subtraction operations on the digital image data inputted sequentially from the data memory circuit 4. Thus, the digital image data of the specific reference pixel region composed of the present-line pixels including the subject pixel and the preceding-line pixels positionally corresponding to the present-line pixels as shown in FIG. 1 are read out from the data memory circuit 4, and the average value of the specific reference pixel region is calculated from Eq. (2). The value obtained as a result of such a calculation is added to the 16-pixel component according to Eq. (3) which produces an average density output. In a binary decision circuit 8, the average density in the specific reference pixel region calculated by the average density computing circuit 6 is compared with the subject pixel data fed from the data memory circuit 4. The result of a black and white decision for the subject pixel data is outputted in the form of a binary signal.

In the manner described above, the average density of the subject pixel $x_n$ is computed and coded into a binary form.

Although the foregoing procedure may be executed again for binary-coding the next subject pixel $x_{n+1}$ as well, the present invention is contrived to effectively utilize the average density $D_n$ already computed relative to the first subject pixel $x_n$. The average density $D_{n+1}$ of the second subject pixel $x_{n+1}$ next to the first subject pixel $x_n$ is obtained from the following equation.

$$D_{n+1} = D_n + \frac{X_{n+9} - X_{n-7}}{16} \quad (4)$$

That is, accumulated value of the 2nd through 17th pixels is obtained by subtracting the data of the 1st pixel from the accumulated data of the 1st through 16th pixels and then adding the data of the 17th pixel thereto. Subsequently, such a procedure is repeated to encode the present-line pixels into a binary value.

As described hereinabove, the image processing apparatus and method of the present invention are constituted so that, relative to each of the pixel units obtained by scanning and sampling the original image, a first average density level is detected which represent the average density level of the pixel unit within a first specific reference pixel region composed of pixel unit groups adjacent to the subject pixel on the left and right. A a second average density level is detected which represents the average density level of the pixel unit within a second specific reference pixed region composed of a pixel unit group adjacent to the first specific reference pixel region from above. The density level of the subject pixel unit is determined in accordance with the first and second average density levels, so that the gradation is rendered correctable. Consequently, it becomes possible to eliminate with certainty both granular noises in the original image and any noise components derived from the soiled surface of the original. Furthermore, correction of the gradation can be executed with a sufficient margin in the density variation range, hence a satisfactory image reproduction is realized with a high image sharpness.

While only certain embodiments of the present invention have been described, it will be apparent to those skilled in the art that various changes and modifications may be made therein without departing from the spirit and scope of the present invention as claimed.

What is claimed is:

1. An image processing method for expressing a halftone-including original image obtained from an image reader having binary black-and-white pixels and for reproducing the halftone-including original image as a binary-coded output, wherein said image processing method comprises the steps of:

- scanning and sampling the halftone-including original image and developing a digital image signal, therefrom, corresponding to a specific pixel line;
- storing said digital image signal at a predetermined address in memory means;
- calculating a first average density value for a first specific pixel line corresponding to a present image line of said digital image signal centered about a subject pixel;
- calculating a second average density value for a second specific pixel line corresponding to a line preceding and adjacent to said present image line stored in said memory means and adjacent to said present image line;
- calculating an average density output by averaging said first and second average density values; and
- comparing the density value of said subject pixel with said average density output to develop a binary black-or-white pixel value for said subject pixel region, thereby producing the binary-coded output for correcting the halftone-including original image gradation.

2. The image processing method of claim 1 wherein said first specific pixel line is a first 16x1 pixel region inclusive of said subject pixel being bounded by 7 pixels in a first direction on said present line and 8 pixels in a second direction on said present line, and said second specific pixel line is a second 16×1 pixel region directly adjacent to said first 16×1 pixel region so that a 16×2 pixel region is formed when said first and second 16×1 pixel regions are combined, whereby said 16×2 pixel region is used to calculate said average density output.

3. Image processing means for expressing a halftone-including original image obtained from an image reader having binary black-and-white pixels and for reproducing the halftone-including original image as a binary-coded output, wherein said image processing means comprises:

- scanning and sampling means for developing a digital image signal corresponding to a specific pixel line of the halftone-including original image obtained from said image reader of the halftone-including original image;
- memory means for storing said digital image signal at a predetermined address;
- average density computing means for calculating a first average density value for a first specific pixel line corresponding to a present line of said digital image signal that is centered about a subject pixel and for calculating a second average density value for a second specific pixel line corresponding to a line and adjacent to said present image line stored in said memory means whereby an average density output is produced by averaging said first and second average density values; and
- binary comparison means for comparing the density value of said subject pixel with said average density output to develop a binary black-or-white pixel value for said pixel region, thereby producing the binary-coded output for correcting the halftone-including original image gradation.

4. The image processing means of claim 2 wherein said first specific pixel line is a first 16×1 pixel region inclusive of said subject pixel being bounded by 7 pixels in a first direction on said present line and 8 pixels in a second direction on said present line, and said second specific pixel line is a second 16×1 pixel region directly adjacent to said first 16×1 pixel region so that a 16×2 pixel region is formed when said first and second 16x1 pixel regions are combined, whereby said 16×2 pixel region is used to calculate said average density output.

* * * * *